Nov. 11, 1958  A. G. BADE  2,859,848
OVERLOAD RELEASE MECHANISM
Filed Sept. 24, 1954  2 Sheets-Sheet 1
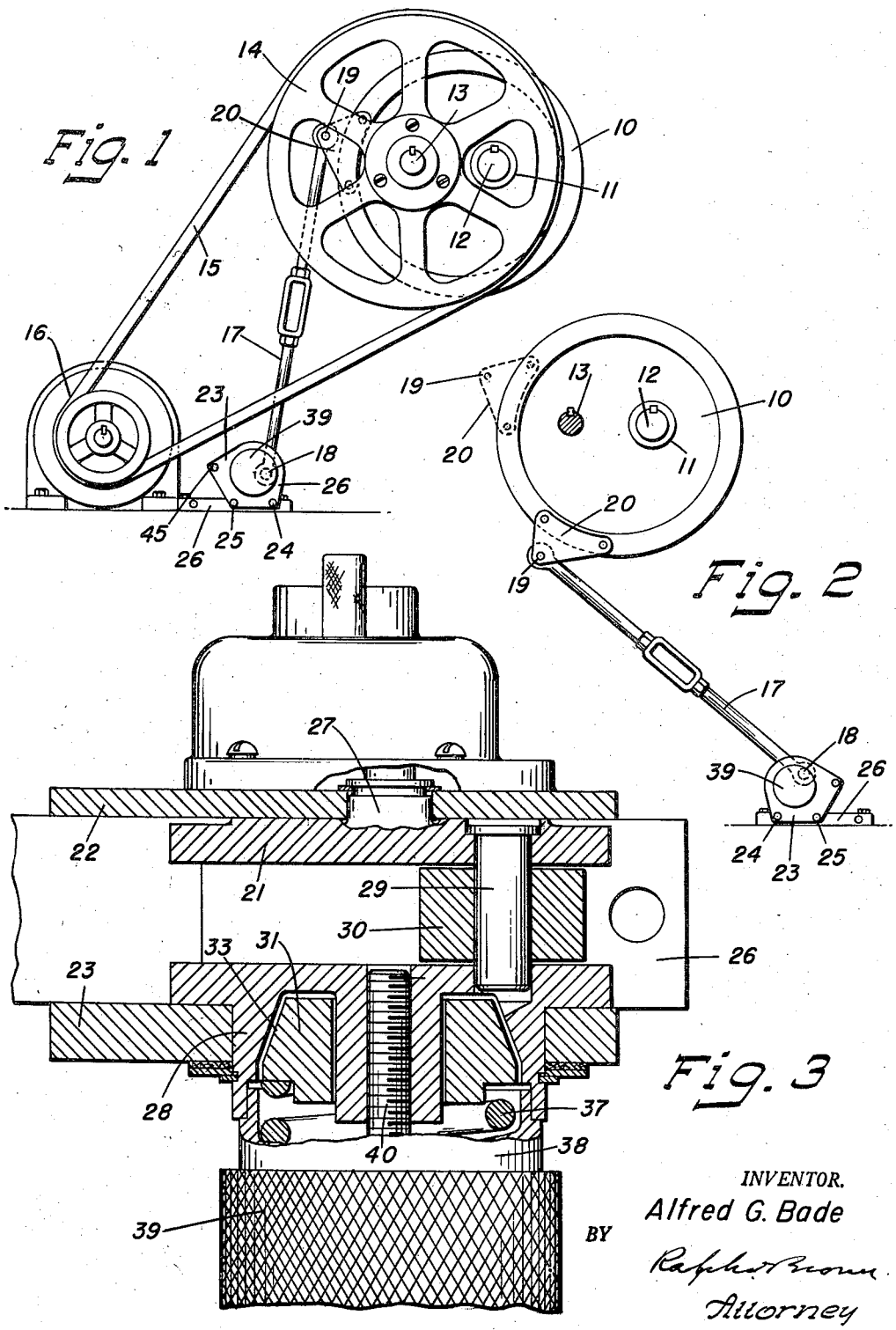
INVENTOR.
Alfred G. Bade
BY
*Attorney*

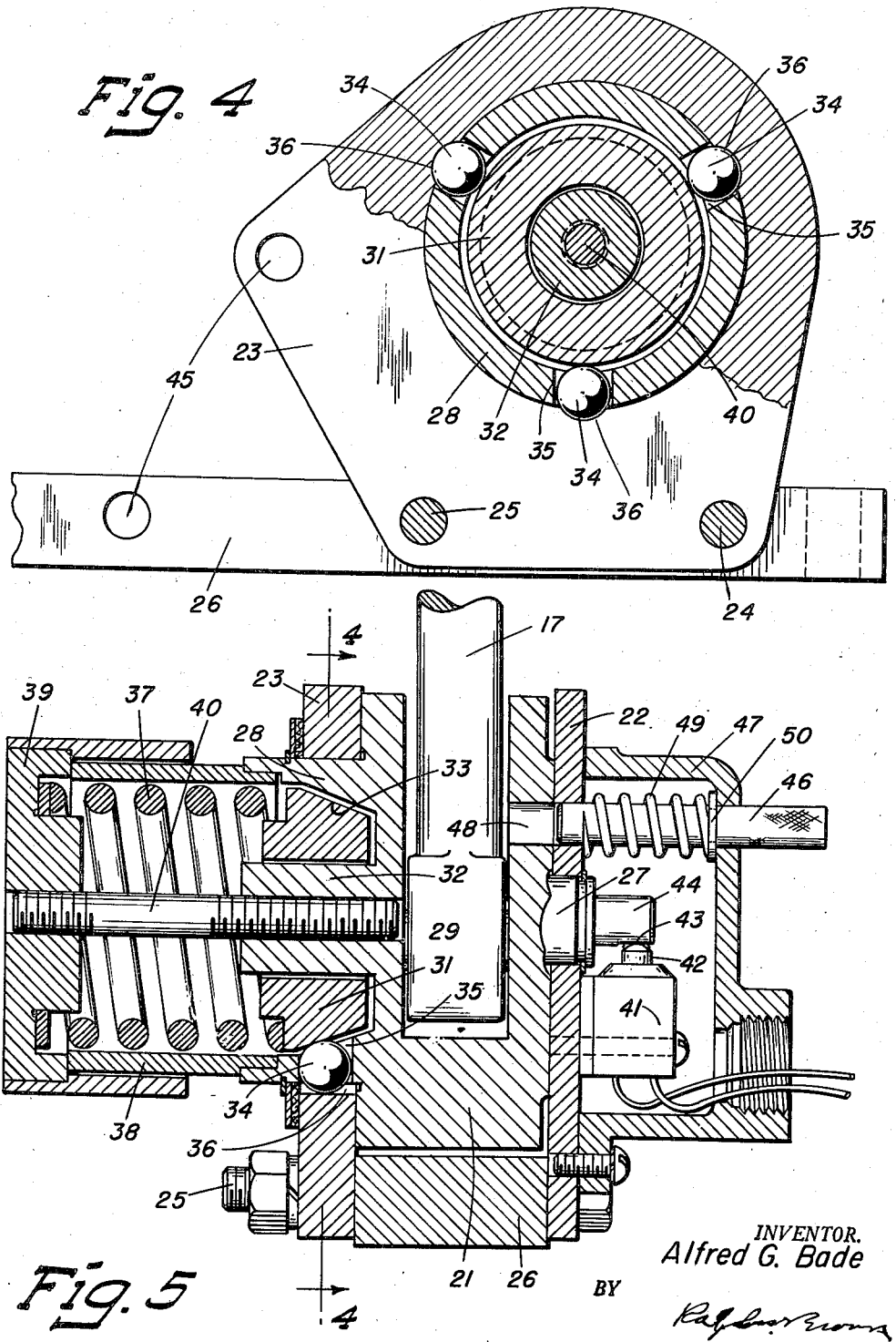

United States Patent Office 2,859,848
Patented Nov. 11, 1958

2,859,848

OVERLOAD RELEASE MECHANISM

Alfred G. Bade, Wauwatosa, Wis.

Application September 24, 1954, Serial No. 458,044

3 Claims. (Cl. 192—150)

This invention relates to overload release mechanisms for shaft mounted drives.

Drives of this type commonly comprise a speed reduction gear set enclosed in a suitable housing and including input and output shafts journalled therein, the output shaft being hollow to telescopically receive an end of the drive shaft of a driven machine to drive the latter and to derive support therefrom. Suitable torque reaction means, commonly in the form of linkage suitably anchored and attached to the housing, sustains the housing against rotation about the axis of the output shaft under the influence of the transmitted torque.

A drive of this type is disclosed in the copending application of Walter P. Schmitter, Serial No. 246,421 (now abandoned), the drive therein shown being equipped with an overload release mechanism contained in the torque reaction linkage and responsive to the torque induced stresses therein. In the various industrial applications of this drive, however, the point of anchorage of the linkage may vary widely, with a consequent variation in the angular disposition of the linkage relative to the housing and a corresponding variation in the torque induced stresses in the linkage for a given torque load on the drive. Due to these conditions, a special adjustment of the release mechanism is ordinarily required for each installation in order to avoid an objectionable premature or belated release of the mechanism.

One object of the present invention is to provide a self-compensating overload release mechanism for drives of this type which will reliably function to effect a timely release in response to a predetermined torque load irrespective of the angular disposition of the torque reaction linkage.

Another object is to provide an overload release mechanism for the purposes indicated which may be rendered momentarily ineffective during starting periods so as to permit transmission of starting torques ordinarily materially higher than those during normal operation.

Other more specific objects and advantages will appear, expressed or implied, from the following description of an illustrative embodiment of this invention.

In the accompanying drawings:

Figure 1 is an elevational view of a shaft mounted drive equipped with an overload release mechanism constructed in accordance with the present invention.

Figure 2 is a similar view, with parts removed, illustrating a modified position of the release mechanism.

Figure 3 is a horizontal sectional view of the release mechanism on a larger scale.

Figure 4 is a vertical sectional fragmentary view taken substantially along the line 4—4 of Fig. 5.

Figure 5 is a vertical sectional view taken at right angles to that of Fig. 4.

The shaft mounted drive shown in Figs. 1 and 2 is fully disclosed in my copending application Serial No. 293,793. It involves a circular housing 10 having a hollow output shaft 11 eccentrically disposed therein and adapted to telescopically receive and drive the drive shaft 12 of mechanism to be driven thereby and to provide a pivotal support for the housing 10. An input shaft 13 journalled within the housing provides support for a pulley 14 driven through suitable belting 15 from a motor 16. The shafts 13 and 11 are interconnected through appropriate gearing contained in the housing 10, and the input shaft 13 is radially spaced from the output shaft 11, so that the tension in the belting 15 may be regulated and controlled by rotative adjustment of the housing about the axis of the supporting shaft 12.

In this instance the housing 10 is sustained in any desired position of rotative adjustment by a longitudinally adjustable link 17 having one end suitably anchored at 18 and the other end attached at 19 to a suitable bracket 20 fixed to the periphery of the housing at a side thereof remote from the eccentrically disposed output shaft 11. To more readily accommodate the drive to driven mechanisms of various types, the bracket 20 is attachable to the housing at either of two points, as illustrated in Figs. 1 and 2 respectively, at opposite sides of that housing diameter that extends through the axis of the shaft 11, and in either position of the bracket 20 the link 17 may extend therefrom in various directions to any point of convenient anchorage. In any event the link functions either in tension or compression to sustain the housing 10 against rotation under reaction of the transmitted torque load and to so position the same as to normally maintain a working tension in the belt 15, and with the input shaft 13 so positioned as to swing into belt releasing position whenever the link 17 is released.

The link 17 is shown flexibly connected to an appropriate overload release mechanism constituting a unit separate and apart from the link 17. The release mechanism shown comprises a hollow crank disk 21 rotatably supported by and between two parallel plates 22 and 23 releasably secured by through bolts 24 and 25 to an intermediate anchor plate 26. A supporting pintle 27 projecting from one side of the crank disk 21 is journalled in the plate 22; and an annular flange 28, projecting from the opposite side of the crank disk in coaxial relation with the pintle 27, is rotatably seated in the plate 23 to provide additional support for the disk. The link 17 extends loosely into the hollow crank disk 21 and is flexibly connected thereto by a crank pin 29 removably fixed therein and extending through an eye 30 provided at the end of the link. The pin 29 is radially offset from the common axis of the pintle 27 and annular flange 28.

The crank disk 21 is releasably retained against rotation preferably by a spring loaded camming device such as will now be described. The camming device shown includes an annulus 31 loosely disposed concentrically within the annular flange 28 and loosely encircling a central concentric boss 32 projecting from the crank disk. The annulus 31 has a conical external surface 33 tapering toward the disk 21 and bearing against a plurality of equally spaced ball detents 34. Each of the balls 34 is guided within a bore 35 extending radially through the flange 28, and each is seated in a groove 36 extending transversely through the plate 23. The interior of the flange 28 is preferably tapered to substantially parallel the taper of the annulus 31.

The annulus 31 is axially urged preferably by a compression spring 37 in such direction as to forcibly retain the balls 34 in their respective grooves 36, so as to releasably lock the disk 21 against rotation and so that the crank pin 29 provides a normally fixed anchorage for the link 17. However, when the crank 21 is urged to rotate by force transmitted through the link 17, the grooves 36 react to urge the balls 34 inwardly, and they in turn react on the conical surface of the annulus 31 to urge the latter to retract against the thrust of the spring 37. When the force transmitted through the link 17 is of sufficient magnitude to actually effect such retraction of the annulus 31, the balls 34 are thereby rendered free to clear the grooves 36, and the crank disk 21 is thus rendered free for limited rotation, whereby the link 17 and housing 10 become free to move in a direction to release the working tension in the belt 15 and the pulley 14 comes to rest.

In this instance the spring 37 is shown enclosed in a housing 38 mounted on the flange 28 and having an end cover 39 fixed to and supported by a threaded rod 40 screwed into the boss 32. The spring 37 is longitudinally confined between the annulus 31 and the cover 39 and is adjustable by rotation of the cover 39 to vary and predetermine the torque at which the crank disc 21 and link 17, and consequently the belt tension, will be released in the manner above described.

After the belt tension has thus been automatically released, it may be readily restored by rotative readjustment of the housing 10 into belt tensioning position. Such readjustment results in a simultaneous rotation of the crank disk 21 and an automatic return of the balls 34 into reengagement with the respective grooves 36, whereby the link 17 and housing 10 are again sustained in belt tensioning position.

Provision is made in the device shown for automatically de-energizing the driving motor 16 when the belt 15 is released. This is accomplished in this instance by the use of a motor stop switch 41 of a well known type having a normally extended control element 42 depressible to open the switch and thereby stop the motor. The switch 41 is shown mounted on the plate 22 with the control element 42 thereof in substantial contact with a depressed flat face 43 formed on the underside of a reduced extension 44 of the pintle 27. The arrangement is such that upon belt-releasing rotation of the crank disk 21 in the manner above described, the pintle extension 44 acts on the switch controller 42 to open the switch 41 and thereby de-energize the motor 16.

It will be noted that a release mechanism has been provided which may be relied upon to release the driving belt 15 and to de-energize the motor 16, whenever the transmitted torque load exceeds a predetermined maximum, regardless of the angular disposition of the link 17. That is to say, the release mechanism may be fixedly mounted in any of a multiplicity of locations with the link 17 extending at any of various angles from the housing 10, without materially modifying the effect of the torque load on the release mechanism. This is true so long as the effective crank arm of the crank disk 21 (as measured from the axis of the disk to the axis of the crank pin 29) is approximately parallel to the effective crank arm of the housing 10 (as measured from the axis of the output shaft 11 to the point of attachment 19 of the link) and so long as the link is angularly related to both of said effective crank arms. Such a relation between the two above noted effective crank arms is illustrated in Fig. 1, and that relation is maintained in all locations of the release mechanism, if in such locations the anchor plate 26 is horizontally disposed.

With the bracket 20 attached to the housing 10 in the alternative position shown in Fig. 2, a similar approximately parallel relation, between the effective crank arm of the disk 21 and the new or alternative effective crank arm of the housing 10 is obtainable by tiltingly adjusting the release mechanism relative to its anchor plate 26 to the new position illustrated in Fig. 2. To effect this new or alternative position of the release mechanism, the bolt 24 is removed, the side plates 22 and 23 are swung as a unit about the bolt 25 to the new position shown and secured in that new position by inserting and fixing the bolt 24 into suitable coacting holes 45 in the side plates and anchor plate 26. The above noted effective crank arms in the Fig. 2 arrangement remain in approximate parallelism in all of the various locations in which that mechanism may be mounted and in all angular positions assumed by the link 17, so long as the anchor plate 26 is horizontally disposed, and the several parts coact in the same manner to produce the same result, as in the arrangement of Fig. 1.

As hereinabove described the release mechanism functions as a yieldable anchorage for the link 17. The link 17, however, may be otherwise fixedly anchored and the release mechanism fixedly attached to the housing 10 to form a yieldable connection between the link and housing. With the release mechanism thus attached so that the effective crank arm thereof is yieldably sustained in a position definitely related to the housing, the release mechanism will function in the same manner to produce the same effect as when arranged in the manner hereinabove described. That is to say, when thus attached to the housing, the release mechanism may be relied upon to effect release of the belt 15 whenever the torque load exceeds a predetermined maximum, regardless of the angular disposition of the link 17, so long as the link is angularly disposed relative to the effective crank arm of the release mechanism.

In the release mechanism shown provision is made for rendering the same ineffective during periods of starting so as not to interfere with the effective transmission of high momentary torque loads occurring during such periods. In this instance this is accomplished by the use of a lock pin 46 which is shown guided for lengthwise movement in the plate 22 and in the wall of an auxiliary housing 47 attached to the latter. Pin 46 is aligned with a perforation 48 provided in the crank disk 21, and a compression spring 49, reacting with a collar 50 carried by the pin 46, yieldably retains the latter in a retracted position clear of the disk 21.

At the time of starting, or whenever it is desired to permit transmission of a momentary overload, the pin 46 may be advanced into engagement with the perforation 48 by manual pressure applied to the exposed end of the pin, to thereby lock the crank disk 21 against belt releasing rotation, and upon release of the manual pressure, the spring 49 functions to retract the pin 46 so as to permit the crank disk to perform its normal overload releasing function.

Various changes may be made in the embodiment of the invention hereinabove specifically described without departing from or sacrificing the advantages of the invention as set forth in the appended claims.

I claim:

1. In combination with a housed gear set having a torque transmitting shaft and a housing urged to rotate about said shaft by reaction of the transmitted torque, a link pivotally secured to said housing in spaced relation to said torque transmitting shaft to create a housing crank arm between said shaft and pivot; a crank disc supported for rotation and a pivotal connection between said link and said crank disc, said last mentioned pivot being spaced from the rotation axis of the crank disc to create a crank disc crank arm; detent means normally supporting said crank disc in a position wherein the crank disc crank arm is substantially parallel to the housing crank arm; and torque responsive means operable to release said detent means in response to torque in excess of a predetermined maximum.

2. In combination with a housed gear set having a torque transmitting shaft and a housing urged to rotate about said shaft by reaction of the transmitted torque, a link pivotally secured to said housing in spaced relation to said torque transmitting shaft to create a housing crank arm between said shaft and pivot; a crank disc supported for rotation and a pivotal connection between said link and said crank disc, said last mentioned pivot being spaced from the rotation axis of the crank disc to create a crank disc crank arm; detent means releasably supporting said crank disc in a position wherein the crank disc crank arm is substantially parallel to the housing crank arm; and normally ineffective means manually operable into locking engagement with said crank disc to selectively prevent or permit its release.

3. In combination with a housed gear set having a torque transmitting shaft and a housing urged to rotate about said shaft by reaction of the transmitted torque, a link pivotally secured to said housing in spaced relation to said torque transmitting shaft to create a housing crank arm between said shaft and pivot; a crank disc journaled for rotation in a supporting element and a pivotal connection between said link and said crank disc, said last mentioned pivot being spaced from the rotation axis of the crank disc to create a crank disc crank arm; a circular set of ball detents carried by said crank disc and engageable with said support to normally lock said crank disc in a position wherein the crank disc crank arm is substantially parallel to the housing crank arm; and a spring urged cam ring acting on said detents to yieldably sustain the same in locking position.

References Cited in the file of this patent

UNITED STATES PATENTS

| | | |
|---|---|---|
| 970,140 | Trowbridge | Sept. 13, 1910 |
| 2,046,283 | Berlyn | June 30, 1936 |
| 2,132,951 | Hall | Oct. 11, 1938 |
| 2,238,583 | Dodge | Apr. 15, 1941 |
| 2,342,540 | Hale | Feb. 22, 1944 |
| 2,554,969 | Williams | May 29, 1951 |
| 2,606,638 | Russell | Aug. 12, 1952 |
| 2,753,969 | Chung | July 10, 1956 |

FOREIGN PATENTS

| | | |
|---|---|---|
| 502,382 | Great Britain | Mar. 16, 1939 |